United States Patent Office 3,149,050
Patented Sept. 15, 1964

3,149,050
PROCESS FOR THE PRODUCTION OF 11α-HYDROXYLATION STEROIDS WITH PANAEOLUS
Carlos Casas-Campillo, Mexico City, Mexico, assignor to Syntex Corporation, Panama, Panama, a corporation of Panama
No Drawing. Filed July 16, 1962, Ser. No. 210,213
Claims priority, application Mexico July 24, 1961
4 Claims. (Cl. 195—51)

The present invention relates to a new process for preparing certain cyclopentanoperhydrophenanthrene derivatives.

More specifically, it relates to a method for introducing a hydroxyl group at C-11α of steroidal compounds, by incubation with microorganisms of the Agaricaceae family, as described hereinafter in detail.

This method allows the conversion of androstane and pregnane derivatives into the 11α-hydroxylated compounds. As it is well known, such compounds are by themselves therapeutic agents, or are also intermediaries for the preparation of other compounds of therapeutic value, since by oxidation they afford the corresponding 11-ketones. On the other hand, the 11α-hydroxy steroids obtained, in accordance with our invention, may be converted by known methods into the 9α-halo-11β-hydroxy derivatives as well as into the 9α-halo-11-keto compounds.

Several microorganisms, especially those belonging to the Rhizopus genus, effect the introduction of an 11α-hydroxyl group in the steroidal molecule; however, in some cases the yields obtained are not very high, and furthermore, hydroxylation may occur at other positions, such as C-6.

In accordance with the present invention, it has been found that microorganisms of the Basidiomiceteae class, Agaricales order, Agaricaceae family of the Panaeolus genus, are capable of introducing an 11α-hydroxyl group into compounds of the androstane as well as of the pregnane series in very good yields and without causing simultaneous hydroxylation at other positions of the steroidal molecule; the conditions employed for carrying out the reaction furnish products which are easy to isolate in a high degree of purity.

As has been set forth above, the method of the present invention may be employed for the 11α-hydroxylation of a great variety of steroids unsubstituted at position C-11. Several types of side chain may be present at C-17, and furthermore the steroidal molecule may be substituted at different positions with other substituents such as ketones, free hydroxyl or esterified hydroxyl groups, halogens, methyl groups, etc. The starting compounds may or may not have double bonds at C-4,5, C-5,6 or C-1,2 and C-4,5.

Besides the free compounds, there may be employed as substrates the acetates or other esters, although in some cases the yields obtained are somewhat lower.

The method may be applied with good results for the introduction of an 11α-hydroxyl group, using as substrates androstenedione, testosterone, pregnenolone, 17α-hydroxyprogesterone, desoxycorticosterone, Reichstein's Compound "S," as well as derivatives substituted at other positions of the aforementioned compounds, such as for example 6-halo, 16α or 16β-methyl, 16α-hydroxy or 16α,17α-acetonides.

Particularly, the present invention relates to the conversion of Reichstein's Compound "S," 6α-fluoro-"S," 6α-fluoro-16α-methyl-"S," the 16α,17α-acetonide of "S" and the 1-dehydro derivatives of such compounds, into the corresponding 11α-hydroxy derivatives, which in turn, by known methods, produce the corresponding 11-keto and 9α-fluoro-11β-hydroxy compounds, which are potent anti-inflammatory agents.

As has been set forth above, for the 11α-hydroxylation there are employed microorganisms of the Agaricales order, of the Agaricaceae family, belonging to the Panaeolus genus. Of particular importance are the strains of the P. campanulatus, P. sphinetrinus, P. subbalteatus, P. retirugis, P. papilionaceous and P. acuminatus species.

These microorganisms are described and morphologically characterized by Lange, J. E., Flora Agaricina Danica, vol. 4 (1939), Singer, R., Phylogenie und Taxonomie der Agaricales (1939); Singer R., The Agaricales (1950).

The yields obtained by the method described in the present invention vary according to the starting material, the strain of microorganism employed, etc.

The process of the present invention may be carried out by previously cultivating the microorganism in an adequate medium containing carbohydrates, salts and different sources of organic nitrogen. As sources of nitrogen there may be used soya flour, corn flour, or commercial products such as Casitone, Edamine, yeast extract, Phytone (papaic digest of soya meal, Baltimore Biol. Lab., Baltimore, Maryland), Mycophil, nutrient L–1 (Lactalbumin hydrolyzate, Sheffield Farms, Norwich, N.Y.) or NZ-amine (pancreatic hydrolyzate of caseine, Baltimore Biol. Lab., Baltimore, Maryland).

In practice, the steroid is added sterile conditions, either in crystalline form or in an adequate solvent, for example in acetone or ethanol, to a culture of the microorganism, and the mixture is stirred in the presence of air, with the object of facilitating the growth of the microorganism and the oxygenation of the substrate. Alternatively, the culture medium may be seeded under sterile conditions, with a culture of the microorganism and simultaneously, or when the growth of the organism has been initiated, there is added the steroid. In some cases it is recommended to add the steroid when the microorganism has completed its growth.

There may also be employed enzymatic preparation of the growth of the oxygenating microorganism.

The method which affords best results is that where the microorganism is previously developed in an adequate medium, under aerobic conditions and in the absence of the steroid; the growth obtained is separated by filtration from the medium and washed with distilled water, if desired. The mycelium thus obtained is then suspended in water in which the steroid to be hydroxylated has been previously suspended, and the mixture is stirred under aeration for a period of time fluctuating between 12 and 78 hours, at the end of which the reaction products are isolated by extraction with an adequate solvent.

In general, it is recommended a concentration of the steroid of 5% with respect to the total weight of the substrate, although other concentrations may be employed. Taking into account that the solubility of the steroidal compounds in water is very low, in some cases the oxygenation is very slow; however, the degree of subdivision of the steroid when added to the oxygenating system, either a culture of the microorganism or an enzymatic system, does not seem to affect the yield or the nature of the products.

When a solution of the steroid in a solvent miscible with water is added to an aqueous fermentation system in the presence of a great excess of water, the steroid precipitates in very fine form; however, this method does not seem to favor appreciably the rate of the reaction, compared with the addition of relatively larger crystals of the steroid.

When the oxygenation process is complete, the product may be recovered from the mixture by extraction with a solvent non-miscible with water; adequate solvents for this purpose are: chlorinated hydrocarbons, alcohols or ketones, such as for example chloroform, methylene chloride, carbon tetrachloride, ethylene chloride, etc.; particularly good results are obtained when the extraction of the product is effected with hot ethylene chloride, at temperatures between 40 and 80° C. The extract containing the reaction product and recovered starting compound may be reduced to a small volume or evaporated to dryness, thus obtaining a solid product which may be purified by different methods, the most common being chromatography and crystallization.

The following examples serve to illustrate but are not intended to restrict the scope of the invention:

Example I

A culture of *Panaeolus campanulatus*, originally received from the Centraalbureau voor Schimmelcultures, Baarn, Holland, was maintained by serial transference every 2 weeks, in a mycophil-agar or malt-agar medium, incubating at a temperature of 25 to 28° C.

The growth obtained in an inclined agar tube was suspended in 5 cc. of sterile water. 3 cc. of this suspension were used to inoculate a series of 20 Erlenmeyer flasks, each containing 25 cc. of the following culture medium:

| | |
|---|---|
| Soya flour or corn flour _____ g__ | 10.00 |
| Corn syrup _____ g__ | 20.00 |
| $MgSO_4 \cdot 7H_2O$ _____ g__ | 0.5 |
| $FeSO_4 \cdot 7H_2O$ _____ | Traces |
| Distilled water _____ cc__ | 1000 |

The cultures were incubated under rotatory stirring (250 r.p.m.) at 25–28° C. for 48 hours, until an abundant growth was obtained, which was dispersed using a blender. 5 cc. of the microbial suspension thus obtained was inoculated to each of 80 Erlenmeyer flasks of 125 cc. capacity, each containing 25 cc. of the culture medium, incubating then for 72 hours under the same conditions (at 25–28° C. and with stirring).

To each flask there was then added 5 mg. of Compound "S" (0.2 cc. of a 2.5% ethanol solution) and stirred under aeration for 48 hours, at the end of which the contents of the flasks were mixed and extracted several times with methylene chloride; the extract was washed with water, dried over anhydrous sodium sulfate and evaporated to dryness under reduced pressure. The residue was adsorbed in a column charged with 12 g. of silica gel and 12 g. of celite, previously washed with methylene chloride-acetone 80:20, thus obtaining 150 mg. of $\Delta^4$-pregnene-11$\alpha$,17$\alpha$,21-triol-3,20-dione, identical with an authentic sample of 11-epi-"F."

Example II

In the preceding example there was substituted in the culture medium the soya flour by Casitone (casein hydrolyzate), thus otbaining as final product also 11-epi-hydrocortisone.

Example III

In accordance with the method described in Example I, $\Delta^{1,4}$-pregnadiene-17$\alpha$,21-diol-3,20-dione was converted into $\Delta^{1,4}$-pregnadiene-11$\alpha$,17$\alpha$,21-triol-3,20-dione; 16$\alpha$-methyl-$\Delta^4$-pregnene-17$\alpha$,21-diol-3,20-dione afforded 16$\alpha$-methyl-$\Delta^4$-pregnene-11$\alpha$,17$\alpha$,21-triol-3,20-dione; 6$\alpha$-fluoro-16$\alpha$-methyl-$\Delta^4$-pregnene-17$\alpha$,21-diol-3,20-dione yielded 6$\alpha$-fluoro-16$\alpha$-methyl-$\Delta^4$-pregnene-11$\alpha$,17$\alpha$,21-triol-3,20-dione, and 6$\alpha$-fluoro-$\Delta^4$-pregnene-16$\alpha$,17$\alpha$,21-triol-3,20-dione furnished 6$\alpha$-fluoro-$\Delta^4$-pregnene-11$\alpha$,16$\alpha$,17$\alpha$,21-tetrol-3,20-dione.

Example IV

By essentially following the method described in Example I, but substituting the soya flour by Edamine (lactalbumin hydrolyzate), there was incubated 500 mg. of the 16,17-acetonide of Reichstein's Compound "S," thus obtaining 16$\alpha$,17$\alpha$-isopropylidenedioxy-$\Delta^4$-pregnene-11$\alpha$,21-diol-3,20-dione.

Example V

There was prepared a vegetating growth of *Panaeolus retirugis* (originally received from Centraalbureau voor Schimmelcultures, Baarn, Holland), in the same medium described in Example I, under aeration, and to the culture obtained, there was added a 2% ethanol solution of 6$\alpha$-fluoro-"S," adding 10 mg. of the latter for each 50 cc. of culture. The mixture was stirred at 28° C. under aeration for 60 hours, then extracted several times with ethylene chloride and the extract was washed with water, dried over anhydrous sodium sulfate and evaporated to dryness under vacuum. The residue was purified by chromatography on silica gel. There was thus obtained 6$\alpha$-fluoro-epihydrocortisone.

Example VI

There was prepared a vegetating culture of *P. acuminatus* (originally received from Centraalbureau voor Schimmelcultures, Baarn, Holland), in a culture medium prepared in accordance with Example I, but using Mycophil (soya protein hydrolyzate) instead of soya flour, and to the culture obtained was added 5 mg. of Reichstein's Compound "S" for each 25 cc. of culture. It was stirred at 28° C. under aeration for 72 hours, extracted with methylene chloride, washed with water, dried over anhydrous sodium sulfate and evaporated to dryness under vacuum.

By chromatography of the residue there was obtained 11-epi-hydrocortisone, indentical with the compound obtained in Example I.

The strains referred to in Examples I, V and VI are readily available as *Panaeolus campanulatus* (L.) Fr. strain Routien, as *Panaeolus acuminatus* Fr. sensu Ricken strain Kühner and as *Panaeolus retirugis* Fr. strain Yen Hsun Chu (aB) respectively from the source indicated, being listed for example under these names on page 126 of the 1961 List of Cultures of the Centraalbureau voor Schimmelcultures, Baarn (Holland).

I claim:

1. A process for the production of an 11$\alpha$-hydroxylated steroid comprising subjecting a steroid selected from the group consisting of 11-desoxy androstane series and 11-desoxy pregnane series to the oxygenating action of a species of microorganism of the genus Panaeolus.

2. A process for the production of an 11$\alpha$-hydroxylated steroid comprising subjecting a steroid selectd from the group consisting of 11-desoxy androstane series and 11-desoxy pregnane series to the oxygenating action of *Panaeolus campanulatus*.

3. A process for the production of an 11$\alpha$-hydroxylated steroid comprising subjecting a steroid selected from the group consisting of 11-desoxy androstane series and 11-desoxy pregnane series to the oxygenating action of *Panaeolus acuminatus*.

4. A process for the production of an 11$\alpha$-hydroxylated steroid comprising subjecting a steroid selected from the group consisting of 11-desoxy androstane series and 11-desoxy pregnane series to the oxygenating action of *Panaeolus retirugis*.

References Cited in the file of this patent

UNITED STATES PATENTS 2,966,444     Hasegawa et al. _____ Dec. 27, 1960